United States Patent [19]

Shahid et al.

[11] Patent Number: 5,859,090
[45] Date of Patent: Jan. 12, 1999

[54] INJECTION-MODULABLE, POLYCAPROLACTONE-BASED, BIODEGRADABLE PLASTIC ARTICLES SUCH AS SHOTSHELL COMPONENTS, AND METHOD OF MANUFACTURING SAME

[75] Inventors: Mohammed Shahid, Minneapolis; David C. Longren, Maple Grove, both of Minn.

[73] Assignee: Federal Cartridge Company, Anoka, Minn.

[21] Appl. No.: 591,176

[22] Filed: Jan. 16, 1996

[51] Int. Cl.$^6$ .................................. C08K 5/20; C08K 5/05
[52] U.S. Cl. ........................... 523/124; 524/210; 264/3.3; 264/3.4; 102/473
[58] Field of Search .......................... 523/124; 524/210; 269/3.3, 3.4; 102/473

[56] References Cited

U.S. PATENT DOCUMENTS

| | | | |
|---|---|---|---|
| 3,021,309 | 2/1962 | Cox et al. | 528/358 |
| 3,021,310 | 2/1962 | Cox et al. | 528/357 |
| 3,021,311 | 2/1962 | Cox et al. | 528/358 |
| 3,021,312 | 2/1962 | Cox et al. | 528/358 |
| 3,021,313 | 2/1962 | Cox et al. | 528/358 |
| 3,021,314 | 2/1962 | Cox et al. | 528/358 |
| 3,021,315 | 2/1962 | Cox et al. | 528/358 |
| 3,021,316 | 2/1962 | Cox et al. | 528/358 |
| 3,021,317 | 2/1962 | Cox et al. | 528/358 |
| 3,844,987 | 10/1974 | Clendinning et al. | 47/74 |
| 3,850,862 | 11/1974 | Clendinning et al. | 47/74 |
| 3,850,863 | 11/1974 | Clendinning et al. | 523/128 |
| 3,852,913 | 12/1974 | Clendinning et al. | 47/37 |
| 3,867,324 | 2/1975 | Clendinning et al. | 47/9 |
| 3,919,163 | 11/1975 | Clendinning et al. | 47/74 |
| 3,921,333 | 11/1975 | Clendinning et al. | 47/74 |
| 3,923,729 | 12/1975 | Clendinning et al. | 47/37 |
| 3,929,937 | 12/1975 | Clendinning et al. | 47/9 |
| 3,931,068 | 1/1976 | Clendinning et al. | 220/1 |
| 3,932,319 | 1/1976 | Clendinning et al. | 47/9 |
| 4,931,488 | 6/1990 | Chiquet | 523/126 |
| 5,087,650 | 2/1992 | Willett | 524/47 |
| 5,545,485 | 8/1996 | Hashitani et al. | 523/122 |
| 5,576,409 | 11/1996 | Macyey | 524/714 |

FOREIGN PATENT DOCUMENTS

WO91/05982  5/1991  WIPO.
WO92/18826  10/1992  WIPO.

*Primary Examiner*—Kriellian A. Sanders
*Attorney, Agent, or Firm*—Schroeder & Siegfried, P.A.

[57] ABSTRACT

Nontoxic, biodegradable injection-molded, plastic shotshell components, and method of manufacturing same, the components having a fused degradation composition comprising as its active ingredients polycaprolactone, amide stearate and vegetable oil, the latter two enhancing the degradation activity of the polycaprolactone and imparting injection-moldability thereto.

38 Claims, 1 Drawing Sheet

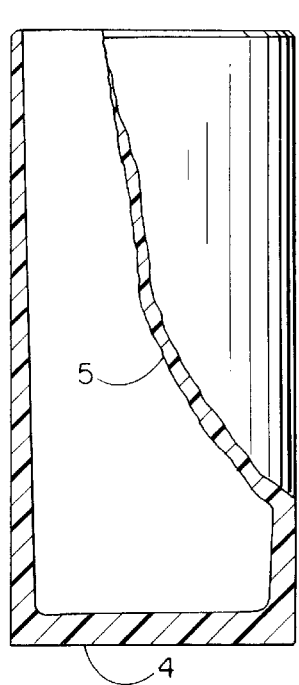
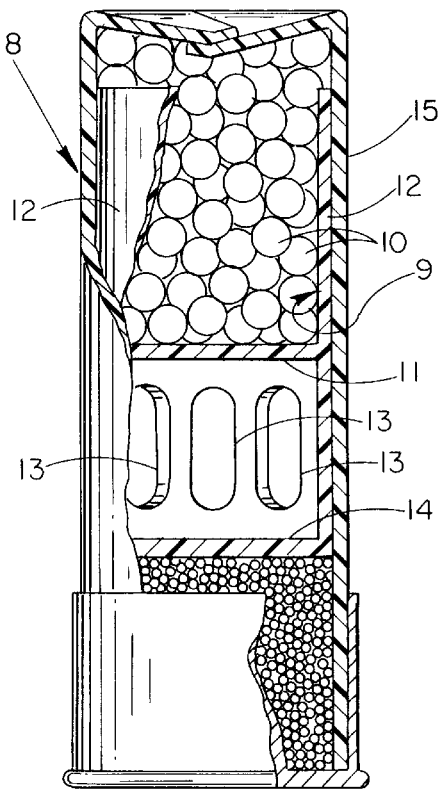
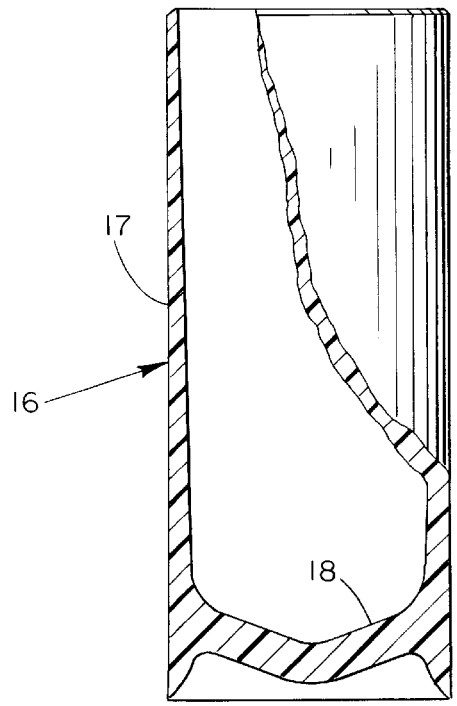

INJECTION-MODULABLE, POLYCAPROLACTONE-BASED, BIODEGRADABLE PLASTIC ARTICLES SUCH AS SHOTSHELL COMPONENTS, AND METHOD OF MANUFACTURING SAME

BACKGROUND OF THE INVENTION

Biodegradation is the degradation and assimilation of organic polymers and other compounds by the action of living organisms. With a few notable exceptions, synthetic plastics are resistant to microbiological degradation, but naturally occurring polymers are susceptible to breakdown by fungi and bacteria. Biological degradation of polymers is facilitated by linearity of the polymer chains and by low molecular weights (below 1,000). These conclusions are supported by laboratory tests in which polymer samples are exposed to mixtures of known micro-organisms and by soil burial tests. Applications for biodegradable plastics in agriculture include slow release urea-formaldehyde fertilizers and degradable containers and matrices for the sustained release of pesticides and herbicides. Absorbable sutures are prominent examples of surgical applications for biodegradable plastics. Absorbable plastics have also been developed for use in orthopedic surgery in the form of screws, pins and plates.

Polycaprolactone polymer systems belong to the family of polymer of cyclic esters. In early 1930, the pioneering work in the area of polymerization was started by W. H. Carruthers.

In late 1950 and the early 1960's, Union Carbide Corporation recognized the usefulness of the above polymer systems and their applications in the molding, coating, fiber, film, and others. Their work resulted in various types of polymer systems and the economically feasible manufacturing systems for the manufacture of these polymer systems. E. F. Cox and F. Hostettler, of Union Carbide, received a number of patents in this field (U.S. Pat. Nos. 3,021,309–3,021,317).

In the late 1960's, in order to overcome a problem faced in the regeneration of forests by bare root planting methods, the U.S. government contacted Union Carbide Corporation to develop biodegradable plastic containers for use in lieu of previously used containers, which were manufactured of non-degradable plastic and surrounded the root systems of the seedlings, to the detriment of their growth. Union Carbide obtained a number of patents, as indicated below, which were directed to this problem. They were:

| | |
|---|---|
| 3,844,987 | 3,923,729 |
| 3,850,862 | 3,921,333 |
| 3,850,863 | 3,929,937 |
| 3,852,913 | 3,931,068 |
| 3,867,324 | 3,932,319 |
| 3,919,163 | |

Each of these patents were related to the biodegradable feature of polycaprolactone. None of these patents contain any suggestion which would lead to the solution of the problems which we confronted in our attempts to develop a shotshell component.

Because of the great resistance of most plastics to environmental degradation, new needs for readily degradable plastics continue to arise. Also, known needs continue to increase or expand, merely because of the continually increased use of plastics by the public. One of the most recently publicized needs for readily degradable plastic is currently being stressed by environmental groups, because of the littering problem created by shotgun shells discharged by hunters. Thus, a need for plastic shotshell components, such as wads, shot-cups, and casings, has received much attention of late. When the hunting is conducted on land, such components rest upon the upper surface of the ground and present an unsightly view. When the shotguns are discharged over water, they tend to float and present other problems in addition to unsightliness. Our invention is directed toward overcoming this problem.

In addition to the need for overcoming the littering problem, there is a need to overcome a related problem, namely the problem created by the toxicity of the material from which shotshell components may be made. As a consequence, our attention was also directed toward the need to provide shotshell components which are nontoxic and will degrade within a reasonable length of time.

Although the above problems are of serious consequence, we also had an additional problem in mind, while seeking to overcome littering and toxicity. This additional problem was the need to provide an improved performance in the shot patterns of shotshells. This related need has arisen as a result of numerous states enacting laws which require the use of steel shot, instead of lead shot, in waterfowl hunting. The underlying reason for this requirement is that it has been well established that spent lead shot, which collect at the bottom of water bodies such as sloughs, become ingested by ducks and geese, which causes their deaths via lead poisoning. Although steel shot have been fairly well accepted, numerous complaints have arisen about their effectiveness, because of their lighter weight, as compared to lead shot. It is well established that steel shot carry a lesser impact upon striking the target because of such lighter weight and, as a consequence, there are many more wounded and unrecovered birds which would have been killed, if struck by the same number of lead shot. It is clear, therefore, that, if satisfactory and equal results are to be obtained in the use of steel shot, an improved pattern performance is necessary. Thus, while we were seeking to overcome toxicity and littering, we also sought to improve the pattern performance of steel shot by providing an improved shotshell component, such as a shot-cup which moves outwardly from the shotshell with the shot upon firing of the shotshell.

As indicated above, it is recognized that we need non-toxicity and rapid degradability, if we are to solve the littering and poisoning problems. The experience of the trade to date has been that polyethylene, particularly linear polyethylene, has been the most suitable plastic for use in the manufacture of shotshell components, such as casings, wads, and shot-cups. The reason for this is that polyethylene has the most suitable engineering properties and provides the most satisfying ballistic data. It has been previously known that polycaprolactone

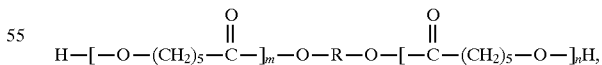

is nontoxic and is the most rapidly degrading plastic available, particularly in cold and wet climates and in water bodies. It appears that polycaprolactone components potentially will degrade rapidly, even in water bodies, such as fresh lakes, seas and other bodies of waters. Its use, however, has been prohibited, because its engineering properties are such that it alone cannot be used, since it has serious rigidity limitations at higher temperatures. Also, commercially available polycaprolactone systems did not yield trouble-free injection-molding processes for the molding of shotgun shell components. We reasoned that, if these two adverse aspects of polycaprolactone could be overcome, perhaps we could arrive at a suitable biodegradable shotshell component which would solve at least one of the above problems, namely littering.

Blending of polyethylene with polycaprolactone, however, is not feasible because the wide differences in their melting temperatures precludes injection-molding of an alloy or blend thereof. If the shot-cup is made of a polymer system consisting of linear polyethylene and the terpolymer, ethylene vinyl acetate carbon monoxide, it is photodegradable, but its degradability is very slow in wet and dark climates, and is not a suitable choice for the aforementioned environment as the degradable plastic.

The reason that polycaprolactone alone has heretofore been considered to be incapable of being injection-molded was that serious difficulty was experienced in obtaining the release of the shotshell components from the mold. We concluded that, if we could somehow modify polycaprolactone so as to obtain a satisfactory release of the parts from the mold, then we would have made progress toward overcoming at least one of its two adverse ammunition characteristics. In an effort to ameliorate this problem, we decided to follow two separate routes.

The first route we followed was to compound and repelletize the polycaprolactone polymer system, after incorporating a release additive package. We found, however, that although this appeared to ameliorate the problem, it lowers the molecular weight of the polycaprolactone polymer system to a substantial extent, and resulted in even further lowering the high temperature rigidity of this material. In view thereof, we felt compelled to discontinue following this approach.

The second route which we followed was to surface-coat the polycaprolactone polymer with liquid and solid lubricants to function as the releasing additive package. By doing so, we avoided the relatively extreme heating and cooling which was associated with the compounding and repelletizing procedure referred to above and, as a consequence, we saved the polycaprolactone from degrading further to yield maximum high temperature rigidity rating for the shotgun shell applications. We have apparently solved the problem in a much more satisfactory manner. We tried calcium stearate, zinc stearate, aluminum zinc stearate, aluminum stearate, and various fatty acid esters and fatty alcohol esters as elements of release additive packages. Although they functioned to a limited extent, none of these release additive packages functioned to a satisfactory degree. We found, however, that a combination of vegetable oil and fatty acid ester amides function in a highly satisfactory manner, if used advisedly, so that the polycaprolactone polymer system becomes readily capable of being injection-molded into the desired shotshell components.

A suitable shotshell component must perform adequately within the range of 150° F. to −20° F. Pure polycaprolactone shotshell components do not yield satisfactory ballistic performance at 150° F. In an effort to ameliorate the high temperature rigidity problem, we chose two routes. The first route was to produce an alloy of polycaprolactone with rigid biochemically degradable plastics. In doing so, we worked with hydroxypropylcellulose, cellulose acetate, lactic acid polymers, and starch-based polymer systems. The hydroxypropylcellulose and starch-polymer system deteriorated the desired properties, and the polymer system became weaker than the initial polycaprolactone. The cellulose acetate and polylactic acid polymers did yield some improvement in that the high temperature rigidity of the system improved for the shotshell application, but simultaneously the low temperature limitations of the initial polycaprolactone increased. Work is being continued in this area.

The second route which we followed in seeking to ameliorate the high temperature rigidity problem was to rigidize and reinforce the polycaprolactone with inorganic fillers and organic fibers, such as cotton flock, talc, calcium carbonate, silica, clay and combinations thereof, and others. This approach failed to meet aforementioned shotgun shell performance, and the work in this area has been terminated.

A third approach is being practiced in a further effort to ameliorate the high temperature rigidity problem of the polycaprolactone polymer system. This approach is based upon a combination of the two above approaches, in which we seek to develop a suitable alloy.

Some notable alloying materials which we have explored, and the results of which are listed, is set forth hereinbelow:

(1) The alloying of various grades of starch-based polymer system, with no positive results.
(2) The alloying of polycaprolactone with terpolymers, with no positive results.
(3) The alloying of polycaprolactone with polylactide polymer systems, with positive results in terms of improvement of high temperature rigidity, but not satisfactory enough to meet total performance requirements.

In all, we have tested 10–15 different materials in combination with polycaprolactone and the alloys thereof, in our efforts to develop a suitable polycaprolactone polymer. To date, the best we have found is the polymer system described and claimed herein.

BRIEF SUMMARY OF THE INVENTION

In brief, we have discovered a method of making polycaprolactone injection-moldable, while apparently improving its degradability, so that it is now possible to produce by the more economical injection-molding processes, shotshell components which will degrade as a result of exposure to micro-organisms and sunlight in a relatively brief period of time (one year). In so doing, however, we have discovered a polymer system which improves the pattern performance of steel shot by 10%–15%. Testing has shown that, when the shotshell components are manufactured by injection-molding of the polycaprolactone polymer system described hereinbelow, the pattern of the shot is improved by 10%–15%, and the shotshell components of the spent shotshell, which would otherwise constitute litter, will readily disintegrate because they are biodegradable.

To produce the above results, we first obtained polycaprolactone, which is available in pelletized forms. We selected pellets, which are generally round in shape and about 0.125" in diameter, so as to maximize surface exposure. This material can be obtained from the following sources:

(1) Union Carbide Chemicals and Plastics Co., Inc., 39 Old Ridgebury Road, Danbury, Conn. 06817-0001, Telephone 1-800-223-0537.
(2) Solvay Polymers, Inc., Technical Center, 1230 Battleground Road, P.O. Box 1000, Deer Park, Tex. 77536.
(3) Daicel Chemical, 1 Tepo-Cho Sakai, Osaka-Pref, Osaka, 590, JAPAN, Telephone 81-6-722-273111.

We add the vegetable oil to the pellets of polycaprolactone, and thereafter tumble the same at room temperatures, for about 4–6 minutes, preferably for about 5 minutes, or until they are evenly coated. Thereafter, we apply amide stearate in powdered form to the vegetable-oil-coated pellets of polycaprolactone and tumble the same in a tumbler at room temperatures for about 4–6 minutes, preferably about 5 minutes or until they are evenly coated with a coating of amide stearate.

At this point, the coated pellets of polycaprolactone are in proper condition for use in the injection-molding process by means of which the desired shotshell component, such as a wad, shot-cup, or casing, may be formed. We have found that, if the shot-cup is formed of this material, it functions as hereinafter explained to improve the pattern of steel pellets by at least 10%. A 10% pattern improvement greatly enhances the killing power of steel shot.

The injection-molding of the shotshell component was accomplished by coating pellets of polycaprolactone first with vegetable oil and next with amide stearate, as hereinbefore described. We utilized 99% by weight of polycaprolactone pellets, 0.5% by weight of vegetable oil and 0.5% by weight of powdered amide stearate. We utilized a 125-ton Van Dorn Injection Molding machine having a 1.562" screw diameter and an L/D=20:1, which is a machine well known in the art. The above material entered the rear zone which was maintained at 170° F., then moved into the center zone which was maintained at 180° F., next into the third zone which was maintained at 190° F. and thence to the nozzle zone which was maintained at 160° F. Injection pressures of 10,000–15,000 psi were utilized, with a minimum back pressure. The temperature of both halves of the mold was maintained at 47° F. The screw was driven at 96 RPM's and the mold close time was 25 seconds. Prior to the injection molding operation, the composition described above was dry blended.

It is believed that the vegetable oil acts as a release agent, while the amide stearate functions as a "slip agent" to improve flowability of the polycaprolactone and, also, as a release agent. In any event, their presence makes the composition, which is at least 98% polycaprolactone, injection-moldable so as to enable the manufacture of shotshell components therefrom.

The amount of vegetable oil which is utilized in forming the above composition is within the range of 0.1%–1.0% by weight, and the amount of amide stearate which is incorporated is 0.1%–1.0% by weight of the composition. The amount of polycaprolactone which is utilized is 98%–99.6% by weight of the entire composition. The preferred amount of polycaprolactone is 99.6% by weight of the composition. The preferred proportion of the amide stearate is 0.2% by weight of the composition. The preferred proportion of vegetable oil is 0.2% by weight of the entire composition.

As indicated hereinabove, we have not yet been able to overcome the rigidity limitations which are inherent in polycaprolactone at 150° F., but we have discovered a way of utilizing same in an economical and beneficial way so as to make a substantial contribution to the art. It is now possible to manufacture a shotshell component via injection-molding processes to produce a shot-cup which is biodegradable and improves the pattern performance of steel shot markedly. In addition, it appears that the presence of vegetable oil and amide stearate in the composition of this new polymer system enhances its degradability. By employing special manufacturing processes, shelving, packaging, and shipping procedures, a highly improved shotshell can be marketed. This product is particularly advantageous in wet and relative dark climates, and functions equally as well as products manufactured of polyethylene. In addition, it poses no safety considerations.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 1 is a side elevational view of a conventional type shot-cup manufactured by our method, with portions thereof broken away;

FIG. 2 is a perspective view of a conventional type shotshell wad manufactured by our method and which may be used separately as a component of a shotshell, with a portion thereof broken away;

FIG. 3 is a side elevational view of a shotshell, with a portion of the sidewall of the casing broken away to show the interior components of a shotshell with another type shot-cup shown therein; and FIG. 4 is a side elevational view of a shot-cup currently in use in the manufacture of shotgun shells, with portions broken away.

As shown in FIG. 1, the conventional type shotshell shot-cup 3 has a wad-like base in the form of a flat circular disc 4, and a thin-walled tube 5 integrally formed therewith and extending forwardly therefrom. As shown, a portion of the tube 5 and disc 4 has been broken away. The entire shot-cup 3 is integrally formed by injection-molding of a plastic composition comprised of 98%–99.6% by weight polycaprolactone, 0.1%–1.0% by weight vegetable oil, and 0.1%–1.0% by weight amide stearate.

The disc 4 has dimensions complementary to the interior dimensions of a casing of a shotshell within which it is intended to be used. As seen, its transverse dimensions are greater than its axial dimensions. It is manufactured with close tolerances to the interior dimension of a shotshell casing so as to perfect a seal therewith upon firing of the shotshell, so as to be driven out of the casing while carrying the shot confined therewithin out of the barrel of the shotgun. The dimensions of the disc 4 are in conformance with the conventional use of wads within a shotshell. The tube 5, likewise, is manufactured to close tolerances between the exterior surface of the tube and the interior wall surfaces of the casing of the shotshell.

As stated in the description of FIG. 2, a shotshell wad 7 may be utilized separately from a shot-cup in either connected or non-connected relation thereto. FIG. 2 shows such a non-connected wad manufactured, in the form of a circular disc, of the same composition as that used to manufacture the shot-cup 3 and disc 4, and having dimensions such as to perfect a seal, with the interior walls of a casing, of the gases generated upon firing of the propellant, which lies behind such a wad. Such a wad may be, and sometimes is, used between the propellant and the shot-cup. It has circumferential dimensions the same as disc 4, relative to the casing in which it may be used.

The wad 7, in the form of a flat disc, covers the propellant and may be connected to the base of a shot-cup by supporting plastic struts (as shown in FIG. 3), which yield somewhat, upon firing of the shotshell. The wad 7 and the disc 4 are each manufactured with close tolerances to the inside dimensions of the tubular plastic casing of a shotshell so as to perfect a seal against bypass of the gases generated by the burning of the propellant, upon firing of the shotshell.

FIG. 3 shows a shotshell 8, the interior of which contains a shot-cup 9 with steel shot 10 therewithin. As shown, the shot-cup therein includes a base or disc member 11 and a thin-walled plastic tube 12 integrally formed therewith via injection-molding of the polycaprolactone composition disclosed herein. Plastic struts 13, which yield somewhat upon firing, and are made of the same plastic composition as the disc member 11, may extend between that disc member 11 and a wad 14 which covers the propellant. The wad 14 is manufactured of the same composition as the shot-cup 9, and integrally therewith via injection-molding, and has the same circumferential dimensions, so as to perfect a seal with the inner surface of the casing 15 of the shotshell.

FIG. 4 shows the shot-cup which we currently are utilizing in the manufacture of shotshells. As shown, this shot-cup 16 has a thin-walled tubular member 17 formed integrally with a base member or disc 18 of the polycaprolactone composition disclosed herein. Wherever herein we have utilized the term disc, it is intended to include all base members utilized to close off the inner end of a shot-cup.

In use, the shot-cup 16 is inserted in the open end of a shotshell casing, similar to casing 15, over the propellant. It is filled with shot made of steel or other metal, and then secured therewithin by crimping the outer end of the plastic casing inwardly in the conventional manner. If desired, the casing may also be made of the polycaprolactone composition disclosed herein.

DETAILED DESCRIPTION OF THE INVENTION

As disclosed in the above Summary, we have discovered a method of producing a plastic shotshell component in the form of a shot-cup which is highly biodegradable and improves the shot pattern of the shotshell by 10%–15%. This improvement in the pattern is of substantial value in that it greatly increases the killing power of the charge of steel pellets.

We have obtained this improvement by discovering a method of treating polycaprolactone so that it becomes injection-moldable without adversely affecting its rigidity at upper temperature levels and, at the same time, improves its pattern as defined. Thus, we first apply a thin even coating of vegetable oil to small pellets of polycaprolactone (PCL) After subjecting such pellets to the vegetable oil, we tumble the same 4–6 minutes (preferably 5 minutes) or until an even coating of the vegetable oil has been accomplished over the outer surface of the pellets. The amount of vegetable oil which we apply is 0.1%–1.0% by weight of the final mixture, preferably 0.2% by weight of that mixture.

Thereafter, we apply 0.1%–1.0% by weight of the final composition, preferably 0.2% by weight thereof, of powdered amide stearate to the vegetable-oil coated pellets. We then tumble said pellets for an additional 4–6 minutes (preferably 5 minutes) or until an even thin coating of amide stearate covers said pellets. The resultant composition is dry blended and is then ready for use in an injection-molding process. As such, it is comprised of 98%–99.6% polycaprolactone, preferably 99.6%.

The purpose and function of the vegetable oil is to facilitate the release of the molded items from the molds of the injection-molding machine. The purpose and function of the amide stearate is to make the polycaprolactone flow more readily and, in addition, to aid in the release of the molded items from the mold. It appears that the addition of the vegetable oil and the amide stearate enhances the degradability of the polycaprolactone.

As indicated previously, we utilize a 125-ton Van Dorn Injection Molding machine, the molds of which are shaped to produce a component of a shotshell, preferably a shot-cup. The latter is designed to fit snugly within the interior of a shotshell and to hold the shot charge. In the case of steel shot, such a shot-cup protects the shot against deformation and also protects the sidewalls of the barrel which define its bore. Our tests show that a shot-cup which is injection-molded, as described herein, of the above composition improves the shot pattern of such shot by 10–15%. Such a shot-cup is more ductile than one manufactured of polyethylene and, therefore, yields more readily to the individual shot as they are driven outwardly within the barrel. The shot-cup permits limited radial expansion of the steel pellet charge. Also, such a shot-cup tends to move with the shot charge for a greater distance beyond the end of the shotgun barrel, as the shot travels toward the target.

The molding machine which we use has a 1.5621" screw diameter and an L/D=20:1. It has four zones through which the mixed-polycaprolactone composition travels, the first being the rear zone which is maintained at a temperature of 170° F. From the rear zone, the polycaprolactone composition travels into and through the center zone which is maintained at 180° F. From the center zone, the composition travels into and through the front or third zone which is maintained at 190° F. From the front zone, the polycaprolactone composition is forced into and through the nozzle zone which is maintained at a temperature of 160° F. Upon leaving the nozzle zone, the polycaprolactone composition enters the individual mold cavities in a fused state which is brought about by the heat and pressures indicated.

We utilize 10,000–15,000 psi of injection pressure, with a minimum of back pressure. The temperature of the mold halves is maintained at 47° F., and the R.P.M. of the screw is 96. The mold close time is 25 seconds. Although we use the injection-molding machine described above, any standard injection-molding machine may be used, if provided with appropriate individual molding cavities.

We find that the above composition is readily injection-moldable in that the molded items are readily freed from the molding cavities of the above machine. Although the primary advantage obtainable as a result of our invention resides in the molding of degradable shot-cups, the same method and materials may be used to mold other degradable shotshell components, such as wads and casings, each of which are part of the littering items sought to be degraded as quickly as possible after the firing of a shotshell. We have found that such items, when manufactured in accordance with our above invention, readily degrade in about one year. We have also found that the improved shot pattern, which the polycaprolactone shot-cup provides, makes the use of steel pellets much more satisfactory than has heretofore been the case, since it substantially enhances their killing power, the weakness of which is the primary complaint of hunters using same.

From the above, it can be seen that we have made a substantial contribution to the art by providing, for the first time, a practical shotshell component which is cost-effective and biodegradable within a reasonable length of time, and also improves the shot pattern, and hence the killing power, of steel shot charges. It should be noted that it appears that a shotshell component manufactured in accordance with this disclosure will degrade quickly, whether above or below the upper surface of a body of water.

It will, of course, be understood that various changes may be made in the form, details, arrangement and proportions of the parts without departing from the scope of the invention which comprises the matter shown and described herein and set forth in the appended claims.

We claim:

1. A biodegradable, nontoxic, plastic article of manufacture formed of an injection-moldable fused composition comprised principally of polycaprolactone surface-coated with minor proportions of fatty acid amide and vegetable oil.

2. The article of manufacture defined in claim 1, wherein said fused composition is comprised of at least 98% polycaprolactone.

3. A biodegradable, nontoxic plastic shotshell component comprising a shotshell shot-cup formed of an injection-moldable fused composition comprised principally of polycaprolactone surface-coated with minor proportions of fatty acid amide and vegetable oil.

4. The shotshell component defined in claim 3, wherein said fused composition is comprised of at least 98% by weight polycaprolactone.

5. The shotshell component defined in claim 3, wherein said fused composition is comprised of about 98–99.6% by weight polycaprolactone, about 0.1%–1.0% a fatty acid amide, and about 0.1%–1.0% vegetable oil.

6. A biodegradable, nontoxic, plastic shotshell component comprising a shotshell wad formed of an injection-moldable fused composition comprised principally of polycaprolactone surface-coated with minor proportions of fatty acid amide and vegetable oil.

7. The shotshell component defined in claim 6, wherein said fused composition is comprised of at least 98% by weight polycaprolactone.

8. The shotshell component defined in claim 6, wherein said fused composition is comprised of about 98%–99.6% by weight polycaprolactone, about 0.1%–1.0% amide stearate, and about 0.1%–1.0% by weight vegetable oil.

9. An injection-molded, biodegradable, nontoxic plastic shotshell component comprising:
  (a) a generally circular plastic disc member having circumferential dimensions complementary to the interior transverse dimensions of a shotshell for installation therein, so as to extend across the interior thereof normal to the longitudinal axis thereof;
  (b) tubular plastic wall structure of relatively thin transverse dimensions integrally connected to the circumferential portions of said disc member and extending axially outwardly therefrom to constitute a shot-cup for such a shotshell, and having exterior circumferential dimensions and shape complementary to the interior surface of such a shotshell casing for installation therein in sealing relation therewith;
  (c) said disc member and said tubular wall structure being injection-molded and formed of a fused composition comprised principally of fused small pre-coated particles of polycaprolactone, said particles having been pre-coated with vegetable oil and amide stearate, prior to their fusion.

10. The shotshell component defined in claim 9, wherein said fused composition is comprised of about 98%–99.6% by weight of polycaprolactone, about 0.1%–1.0% by weight of vegetable oil, and about 0.1%–1.0% by weight of a fatty acid amide.

11. The shotshell component defined in claim 9, wherein said fused composition is comprised of about 99.6% by preferred weight of polycaprolactone, of about 0.2% by preferred weight of vegetable oil, and about 0.2% by preferred weight of amide stearate.

12. The shotshell component defined in claim 9, wherein said fused composition is comprised of about 99.6% by weight of polycaprolactone.

13. The shotshell component defined in claim 9, wherein said fused composition is comprised of about 98%–99.6% by weight of polycaprolactone.

14. The shotshell component defined in claim 9, wherein said fused composition is comprised of about 0.1%–1.0% by weight of amide stearate.

15. The shotshell component defined in claim 9, wherein said fused composition is comprised of about 0.2% by weight of amide stearate.

16. The shotshell component defined in claim 9, wherein said fused composition is comprised of about 0.1%–1.0% by weight of vegetable oil.

17. The shotshell component defined in claim 9, wherein said fused composition is comprised of about 0.2% by weight of vegetable oil.

18. An injection-molded, biodegradable, nontoxic plastic shotshell component which includes:
  (a) a generally cylindrical plastic disc member having diametrical dimensions which exceed its axial dimensions and which are substantially equal to and complementary with the interior wall surface of a shotshell, in order to perfect a seal therewith when fired therefrom;
  (b) said disc having been injection-molded of a composition consisting of a fused mixture which includes particulate polycaprolactone surface-coated with suitable proportions of a vegetable oil and fatty acid amide coating;
  (c) said vegetable oil and fatty acid amide coating constituting no more than 0.2% by weight of said composition.

19. The shotshell component defined in claim 18, wherein said particles of polycaprolactone constitute about 99.6% by weight of said composition.

20. The shotshell component defined in claim 18, wherein said fatty acid a constitutes about 0.1%–1.0% by weight of said composition.

21. The shotshell component defined in claim 18, wherein said fatty acid a constitutes about 0.2% by weight of said composition.

22. The shotshell component defined in claim 18, wherein said vegetable oil constitutes about 0.1%–1.0% by weight of said composition.

23. The shotshell component defined in claim 18, wherein said vegetable oil constitutes about 0.2% by weight of said composition.

24. An injection-molded, biodegradable, nontoxic plastic shotshell component having a degradation composition comprising as its combination of active ingredients:
  (a) about 98%–99.6% by weight of polycaprolactone;
  (b) about 0.1%–1.0% by weight of vegetable oil; and
  (c) about 0.1%–1.0% by weight of a fatty acid amide.

25. The shotshell component defined in claim 24, wherein the percentage by weight of polycaprolactone is about 99.6%.

26. The shotshell component defined in claim 24, wherein the percentage by weight of fatty acid is about 0.2%.

27. The shotshell component defined in claim 24, wherein the percentage by weight of vegetable oil is about 0.2%.

28. An injection-molded, biodegradable, nontoxic plastic shotshell component having a degradation composition comprising as its degradation combination of active ingredients:
  (a) a fusion of polycaprolactone, a fatty acid amide, and vegetable oil;
  (b) said polycaprolactone constituting in excess of 90.0% by weight of said composition;
  (c) said fatty acid amide and vegetable oil constituting by weight relatively minor portions of said composition.

29. A method of manufacture of a plastic, biodegradable, nontoxic shotshell component comprising:
  (a) providing a supply of small particles of polycaprolactone;

(b) applying a thin evenly distributed coating of vegetable oil to the exterior surface of said particles of polycaprolactone;

(c) applying a thin evenly distributed coating of a powdered fatty acid amide to the exterior surfaces of said vegetable oil-coated particles of polycaprolactone; and (d) injection-molding said composition into a shotshell component of desired size and shape.

30. The method defined in claim 29, wherein said vegetable oil is applied upon the exterior surfaces of the particles of polycaprolactone and thereafter tumbling same.

31. The method defined in claim 29, wherein the fatty acid amide is applied by applying the amide in powdered form to the vegetable oil-coated particles and thereafter tumbling same.

32. The method defined in claim 29, wherein the supply of polycaprolactone constitutes about 98%–99.6% by weight of the fused composition.

33. The method defined in claim 29, wherein the supply of polycaprolactone constitutes about 99.6% by weight of the fused composition.

34. The method defined in claim 29, wherein the amide stearate constitutes about 0.1%–1.0% by weight of the fused composition.

35. The method defined in claim 29, wherein the vegetable oil constitutes about 0.1%–1.0% by weight of the fused composition.

36. The method defined in claim 29, wherein the vegetable oil constitutes about 0.2% by weight of the fused composition.

37. The method defined in claim 29, wherein the amide is amide stearate and constitutes about 0.2% by weight of the fused composition.

38. A method of manufacture of plastic, biodegradable, nontoxic shotshell components comprising:

(a) providing a supply of small particles of polycaprolactone;

(b) coating said particles of polycaprolactone with a thin coating of vegetable oil;

(c) tumbling said coated particles of polycaprolactone in a tumbler until said vegetable oil is substantially evenly distributed on the outer surface of said particles;

(d) applying powdered amide stearate to the exterior surface of said tumbled particles to cause the same to adhere to the coated exterior surfaces thereof;

(e) tumbling said amide stearate-bearing particles in a tumbler until the powdered amide stearate is substantially evenly distributed on the outer surface of said vegetable-oil-coated particles; and (f) injection-molding said so-coated particles of polycaprolactone into the desired size and shape of a shotshell component.

* * * * *

UNITED STATES PATENT AND TRADEMARK OFFICE
CERTIFICATE OF CORRECTION

PATENT NO. : 5,859,090
DATED : January 12,1999
INVENTOR(S) : Mohammed Shahid; David C.Longren It is certified that error appears in the above-identified patent and that said Letters Patent is hereby corrected as shown below:

On the title page,Item [54] and column 1 line 1 insert

--INJECTION-MOLDABLE-- and delete "INJECTION-MODULABLE"

Signed and Sealed this

Eighth Day of June, 1999

Attest:

Q. TODD DICKINSON

*Attesting Officer*     Acting Commissioner of Patents and Trademarks